US010584726B2

(12) United States Patent
Milton et al.

(10) Patent No.: US 10,584,726 B2
(45) Date of Patent: Mar. 10, 2020

(54) INDICATION MEANS OF A WEDGE OF A LEAD-THROUGH SYSTEM

(71) Applicant: Roxtec AB, Karlskrona (SE)

(72) Inventors: Stefan Milton, Ramdala (SE); Pierre Berglund, Nättraby (SE)

(73) Assignee: Roxtec AB, Karlskrona (SE)

( * ) Notice: Subject to any disclaimer, the term of this patent is extended or adjusted under 35 U.S.C. 154(b) by 145 days.

(21) Appl. No.: 15/571,473

(22) PCT Filed: May 3, 2016

(86) PCT No.: PCT/SE2016/050396
§ 371 (c)(1),
(2) Date: Nov. 2, 2017

(87) PCT Pub. No.: WO2016/178621
PCT Pub. Date: Nov. 10, 2016

(65) Prior Publication Data
US 2018/0135667 A1 May 17, 2018

(30) Foreign Application Priority Data
May 4, 2015 (SE) ...................................... 1550562

(51) Int. Cl.
F16B 1/00 (2006.01)
H02G 3/22 (2006.01)
(Continued)

(52) U.S. Cl.
CPC .............. *F16B 1/0071* (2013.01); *F16B 2/14* (2013.01); *F16L 5/08* (2013.01); *F16L 5/14* (2013.01); *H02G 3/22* (2013.01); *F16B 1/00* (2013.01)

(58) Field of Classification Search
CPC ........ F16B 1/0071; F16B 2/14; F16B 13/066; F16B 13/068; F16B 1/00; F16L 5/08; F16L 5/14; H02G 3/22
(Continued)

(56) References Cited

U.S. PATENT DOCUMENTS 2,674,772 A * 4/1954 Jacobs ....................... F16L 3/23
24/115 R
3,282,544 A * 11/1966 Brattberg ................ F16L 3/227
248/56
(Continued)

FOREIGN PATENT DOCUMENTS

CN 1914447 A 2/2007
EP 1211450 A1 6/2002
(Continued)

OTHER PUBLICATIONS

Search Report for European Patent Application No. 16789686.9, dated Nov. 16, 2018.
(Continued)

Primary Examiner — Roberta S Delisle
(74) Attorney, Agent, or Firm — Merchant & Gould P.C.

(57) ABSTRACT

The present invention concerns an indication means using the positions of two mutually moveable parts of an element. In one embodiment the indication means is used for a compression wedge of a lead-through system. The wedge comprises a first and a second wedge element (1, 2) moveable towards and away from each other between two extremes. A socket (7) is fastened in a rotatable way to the first wedge element (1) and a screw (6) is fixed to the second wedge element (2). One coloured end (11) of the screw (6) is received in a through opening (17) of the socket (7). The inner surface of said through opening has another colour than the coloured end (11) of the screw (6). The mutual
(Continued)

position of the first and second wedge elements (1, 2) are controlled by rotation of the socket (7) on the screw (6).

6 Claims, 4 Drawing Sheets

(51) Int. Cl.
*F16L 5/08* (2006.01)
*F16L 5/14* (2006.01)
*F16B 2/14* (2006.01)

(58) Field of Classification Search
USPC .......................................... 411/13, 24, 25–28
See application file for complete search history.

(56) References Cited

U.S. PATENT DOCUMENTS

| | | | | |
|---|---|---|---|---|
| 5,188,494 A * | 2/1993 | Hatin | ................... | F16B 31/028 411/10 |
| 5,938,152 A * | 8/1999 | Kreutz | ...................... | F16L 5/08 174/656 |
| 6,095,739 A * | 8/2000 | Albertson | ............. | F16B 1/0071 411/13 |
| 6,817,895 B2 * | 11/2004 | Kiely | ................... | H01R 9/2475 439/488 |
| 7,371,969 B2 * | 5/2008 | Hedstrom | ................. | F16L 5/08 174/151 |
| 8,598,472 B2 * | 12/2013 | Hildingsson | .............. | F16L 5/08 174/362 |
| 8,674,240 B2 * | 3/2014 | Karlsson | ................... | F16L 5/08 174/652 |
| 2003/0110719 A1 * | 6/2003 | Broder | ....................... | F16L 5/08 52/220.8 |
| 2007/0110543 A1 * | 5/2007 | Fitch | ..................... | F16B 1/0071 411/386 |
| 2007/0252341 A1 | 11/2007 | Kreutz | | |

FOREIGN PATENT DOCUMENTS

| | | |
|---|---|---|
| GB | 2186440 A | 8/1987 |
| JP | 2003-289611 A | 10/2003 |
| JP | 2012-081175 A | 4/2012 |
| WO | WO 2007/097706 A1 | 8/2007 |
| WO | WO 2008/010755 A1 | 1/2008 |
| WO | WO 2014/005919 A2 | 1/2014 |

OTHER PUBLICATIONS

International Search Report and Written Opinion for PCT/SE2016/050396 dated Jun. 22, 2016.
Product catalogue 'At Sea', MCT Brattberg AB, Karlskrona, 2014, http://web.archive.org/web/20141125004253/http://www.mctbrattbert.se/ProductCatalogue/~/media/6C47D798FD0ED0ABB545F36DBA341D1.ashx.
Office Action for Chinese Patent Application No. 201680026072.0, dated May 24, 2019 with English Translation.

\* cited by examiner

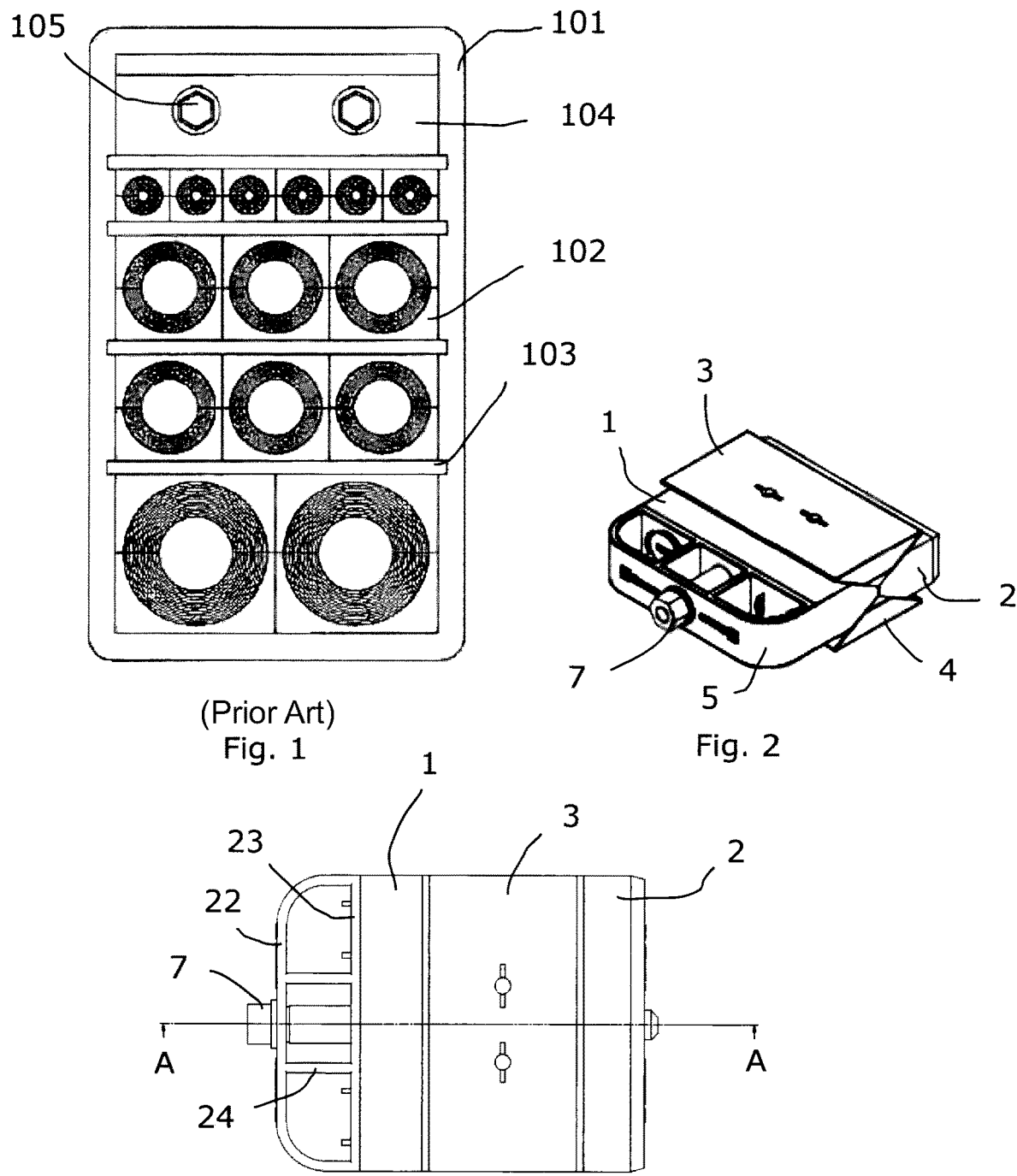

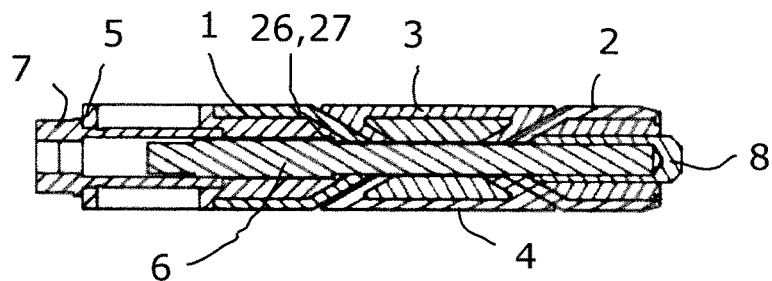
Fig. 4
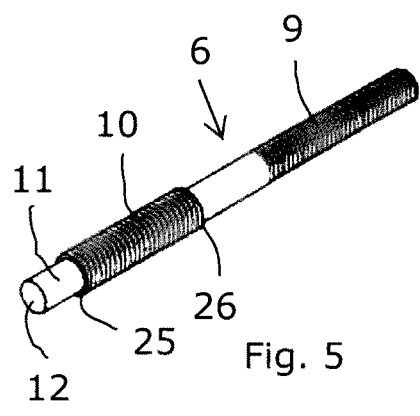
Fig. 5
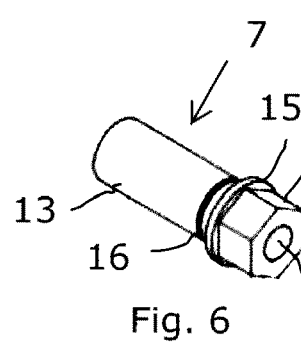
Fig. 6
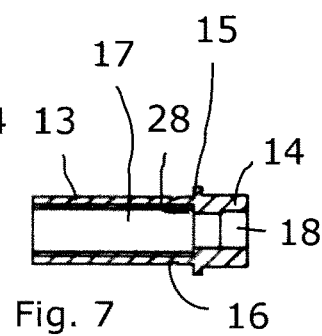
Fig. 7
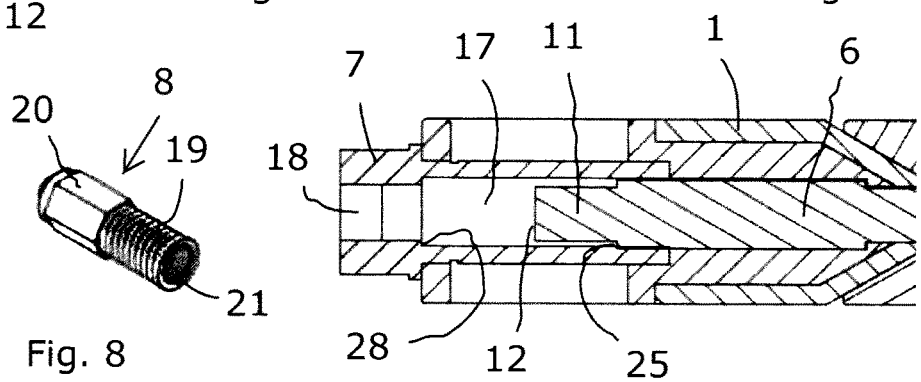
Fig. 8
Fig. 9
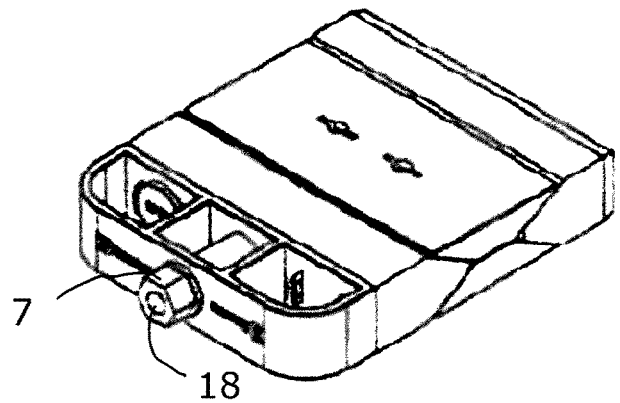
Fig. 10

INDICATION MEANS OF A WEDGE OF A LEAD-THROUGH SYSTEM

TECHNICAL FIELD

The present invention concerns an indication means, indicating a mutual position for two different parts of an element.

PRIOR ART

The principle of the indication means of the present invention may be used in different environments. In the description below the indication means is described mainly in connection with a compression wedge, in an illustrative purpose and should not be seen as limiting the use to such wedges.

The compression wedge is normally used in a lead-through system, which lead-through system comprises a frame, a number of modules, stay plates and the compression wedge. The modules, stay plates and the wedge are placed inside the frame. The modules are made of a compressible material and each module is to receive a cable, pipe or wire. The function of the stay plates is to hinder the modules from going out of the frame in use. The wedge is a compression means which are to compress the modules in order for them to seal inwardly against the pipe, cable or wire and outwardly against other modules, stay plates and/or the frame, depending on placement inside the frame.

In one wedge according to prior art (WO 96/11353), the wedge is moved between a non-compression state and a compression state by means of two screws, whereby each screw has threads with opposite pitches. The screws are connected to two wedge elements, which are moved towards each other if the screws are turned in a first direction and away from each other if the screws are turned in the opposite direction. The threads of the screws are in mesh with threads of the wedge elements, whereby the threads of one of the wedge elements are in mesh with threads of a first pitch of the screws and the threads of the other wedge element are in mesh with threads of an opposite pitch of the screws. Two further wedge elements are placed on sloping surfaces on opposite sides of the two first wedge elements, whereby the two further wedge elements will be moved toward and away from each other depending on the movement of the two first wedge elements. When the two further wedge elements are moved away from each other the thickness of the wedge increases, giving a compression force when the wedge is placed inside the frame.

In lead-through systems of this kind it is vital that the compression force given by the wedge amounts to a predetermined value. If the compression force is below said predetermined value there is a clear risk of not having a tight seal. In the wedge of prior art the decompression force is given when the screws are screwed out, whereby the distance between the screw heads and the wedge increases. Said distance is an indication of the applied compression force. The predetermined force is reached when the distance between the screw heads and the wedge amounts to a certain value. To establish that enough compression force has been applied said distance has to be measured. Such measuring is often cumbersome. A fitter has to alternately measure the distance and draw the screws. Without measuring the distance as discussed above, there is no way to know whether enough compression force has been applied or if unnecessarily high compression force has been applied. Thus, the known measuring method does not give direct indication of that the predetermined force is reached.

SUMMARY

In view of the above, one object of the present invention is to provide an indication means that clearly indicates a desired mutual position between two parts, which two parts are moveable in relation to each other. The indication means should be direct and distinct, in the sense that the correct position is immediately detectable.

The indication means could be used both by a fitter and by any controller to check proper installation.

Depending on placement of the part having the indication means the visibility may be low, in which case it is beneficial if the indication means also can be used as a tactile indicator means.

According to one aspect of the present invention the indication means use the positions of two mutually moveable parts of an element. The indication is given by the position of an end of a first part in relation to a mouth of an opening of a second part, which opening of the second part receives the first part.

According to another aspect of the present invention the indication is given by different colours of at least the end of the first part and the inner surface of the opening of the second part.

According to a further aspect of the present invention the indication means are used for a wedge of a lead-through system, further comprising a frame, modules and stay plates.

Further objects and advantages of the present invention will be obvious to a person skilled in the art when reading the detailed description below of at present preferred embodiments.

BRIEF DESCRIPTION OF THE DRAWINGS

The present invention will be described further below by way of example and with reference to the enclosed drawings. In the drawings:

FIG. 1 is a front view of a lead-through system of prior art,

FIG. 2 is a perspective view of a compression wedge, which could be used in a system as according to FIG. 1, and which compression wedge has an indication means according to the present invention, FIG. 3 is a plan view of the wedge of FIG. 2, FIG. 4 is a sectional view of the wedge along the line A-A in FIG. 3, FIG. 5 is a perspective view of a screw forming a part of the wedge of FIGS. 2-4, FIG. 6 is a perspective view of a socket forming a part of the wedge of FIGS. 2-4, FIG. 7 is a sectional view of the socket of FIG. 6, FIG. 8 is a perspective view of a nut forming a part of the wedge of FIGS. 2-4, FIG. 9 is an enlarged sectional view of the left part of the wedge as seen in FIG. 4 and with the wedge in a first end position, FIG. 10 is a perspective view of the wedge, with the wedge in the first end position as shown in FIG. 9.

DETAILED DESCRIPTION OF EMBODIMENTS

Figure 11:
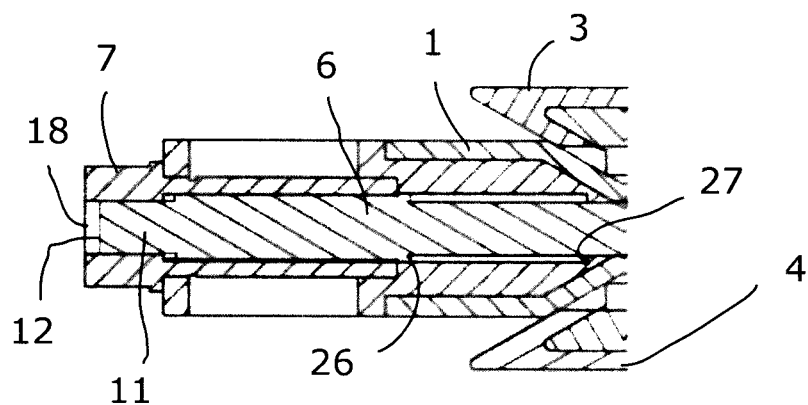
FIG. 11 is an enlarged sectional view of the left part of the wedge as seen in FIG. 4 and with the wedge in an intermediate position.
Figure 12:
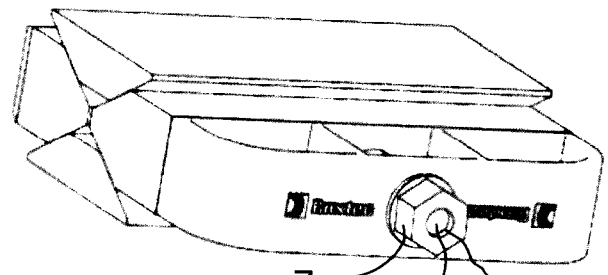
FIG. 12 is a perspective view of the wedge, with the wedge in the intermediate position as shown in FIG. 11.
Figure 13:
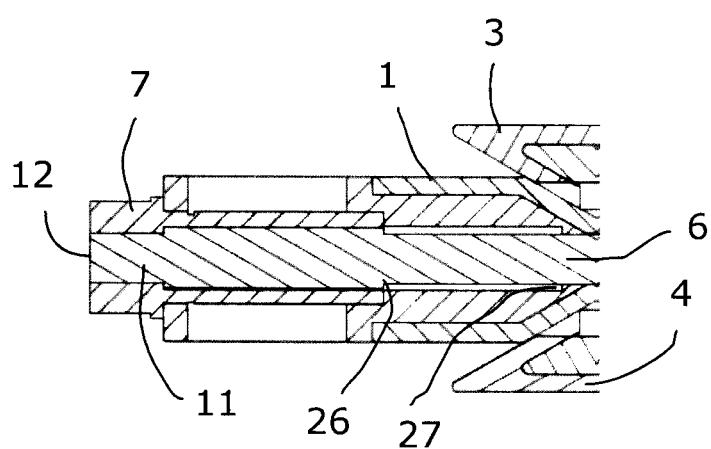
FIG. 13 is an enlarged sectional view of the left part of the wedge as seen in FIG. 4 and with the wedge in a second end position.
Figure 14:
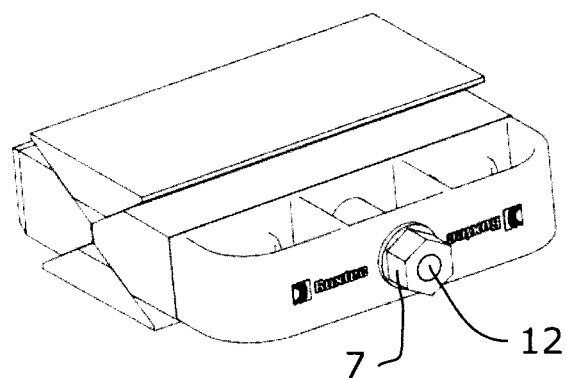
FIG. 14 is a perspective view of the wedge, with the wedge in the second end position as shown in FIG. 13.

In the lead-through system according to prior art shown in FIG. 1 a frame 101 receives a number of modules 102. The frame 101 is to be placed in a transition, such as a wall, roof or floor, and each module 102 is to receive a cable, wire or pipe. To assist in holding the modules 102 in place inside the frame 101 a number of stay plates 103 are arranged between each row of modules 102 inside the frame 101. The stay plates 103 are arranged moveable in longitudinal direction inside the frame 101, i.e. up and down as shown in FIG. 1. A wedge 104 is placed at one inner end of the frame 101, with a stay plate 103 between the wedge 104 and the adjacent row of modules 102. The prior art wedge 104 is a compression unit and by means of screws 105 the wedge 104 can be expanded inside the frame 101. The expansion of the wedge 104 will act on the modules 102 inside the frame 101, whereby the modules 102 will be pressed against each other, against the stay plates 103, against the inner sides of the frame 101 and/or against any cable etc. received inside a module 102, depending on the placement of respective module 102.

The wedge as shown in FIG. 2 comprises a first wedge element 1, a second wedge element 2, a third wedge element 3 and a fourth wedge element 4. The wedge further comprises a handle 5, a screw 6, a socket 7 and a nut 8.

The first and second wedge elements 1, 2 are arranged in line with each other and moveable towards and away from each other. The third and fourth wedge elements 3, 4 are placed above each other and moveable towards and away from each other. The third and fourth wedge elements 3, 4 are placed between the first and second wedge elements 1, 2. The first wedge element 1 abuts the third wedge element 3 and the fourth wedge element 4 along sloped surfaces. The second wedge element 2 abuts the third wedge element 3 and the fourth wedge element 4 along sloped surfaces. The wedge elements 1, 2, 3, 4 and their co-operating sloped surfaces are arranged in such a way that when the first wedge element 1 and the second wedge element 2 are moved toward each other the third wedge element 3 and the fourth wedge element 4 are moved away from each other. Correspondingly, when the first wedge element 1 and the second wedge element 2 are moved away from each other the third wedge element 3 and the fourth wedge element 4 are allowed to move toward each other. The first wedge element 1 and the second wedge element 2 each have a through opening. Said through openings are placed in line with each other in the assembled wedge.

In one embodiment each wedge element 1-4 comprises a core of a harder material than a surrounding outer part. The outer part of each wedge element 1-4 is made of an elastic, compressible rubber material and the core of each wedge element 1-4 is made of a composite. In an alternative embodiment the wedge elements 1-4 are solely made of an elastic, compressible rubber material.

The screw 6 of the wedge is placed in through openings of the first wedge element 1 and the second wedge element 2, respectively. The end of the screw 6 placed inside the second wedge element 2 has an outer thread 9. The opposite end of the screw 6, i.e. the end placed at the first wedge element 1, has also an outer thread 10, except for an outermost, coloured end part 11. In some embodiments all of the end part 11, that is between an outer end surface 12 and the thread 10, is coloured, while in other embodiments only the end surface 12 is coloured. In one embodiment the end part 11 is given a green colour. The coloured end part 11 of the screw 6 forms one part of the indication means of the present invention.

The socket 7 of the wedge has a tubular part 13 and forms a nut 14 at one end opposite the tubular part 13. A flange 15 is formed between the tubular part 13 and the nut 14, which flange 15 projects outwardly around the circumference of the tubular part 13 and is perpendicular to the tubular part 13. The socket 7 is made in one piece. A groove 16 is arranged on the outside of the tubular part 13, which groove 16 goes all around the circumference of the tubular part 13. The groove 16 is placed at a short distance from the flange 15 of the socket 7. The socket 7 has a through opening 17. The inner surface 18 of the through opening 17 is given a colour, at least in the area of the nut 14. In one embodiment the colour on the inner surface 18 of the through opening 17 is red. The through opening 17 has an inner thread in the area of the tubular part 13. The coloured inner surface 18 of the through opening 17 of the socket 7 forms a part of the indication means according to the present invention.

The nut 8 has a tubular part 19 at one end, having an outer thread, and a polygonal part 20. Inside the tubular part 19 and the polygonal part 20 an inner opening 21 is arranged going from the free end of the tubular part 19 up to an outer end. There is no opening in the outer end. The inner opening 21 has an inner thread. The nut 8 is made in one piece.

The handle 5 is integrated with the first wedge element 1. The handle 5 comprises an arc 22, an attachment plate 23 and two struts 24, extending between the arc 22 and the attachment plate 23. The attachment plate 23 abuts the outer softer material of the first wedge element 1 and extends over the total width of the wedge. The arc 22 is placed at opposite ends of the attachment plate 23 and goes via two bent parts over into a straight part. The straight part of the arc 22 is placed at a distance from the attachment plate 23 and is parallel with the attachment plate 23. The straight part of the arc 22 has a through opening placed in the centre of said straight part. Also the attachment plate 23 has a through opening placed in line with the through opening of the arc 22. The struts 24 are placed at a distance from each other, which distance should be at least big enough to give room for the socket 7.

The third and fourth wedge elements 3, 4 are connected to each other by two spring arrangements. By means of the spring arrangements the third and fourth wedge elements 3, 4 will be urged in a direction towards each other.

In the shown embodiment the nut 8 is fastened inside the second wedge element 2. The second wedge element 2 is in one embodiment formed around the tubular part 19 and the polygonal part 20 of the nut 8. The material of the second wedge element 2 will then go into the outer thread of the tubular part 19 and be placed abutting all of the sides of the polygonal part 20 of the nut 8. The nut 8 will thereby be held firmly inside the second wedge element 2 and be hindered to do any axial or rotational movements. The end opposite the coloured end 11 of the screw 6 is inserted into the nut 8. The screw 6 is screwed into the inner opening 21 of the nut 8, by means of co-operation between the thread 9 of the screw 6 and the thread of the inner opening 21 of the nut 8. The end of the screw 6 is locked from rotating inside the threaded inner opening 21 of the nut 8 by means of a thread-locking fluid or threadlocker.

The socket 7 is placed going through the central through opening of the arc 22 of the handle 5 and through the central through opening of the attachment plate 23 of the handle 5. The free end of the tubular part 13 of the socket 7 is received in the through opening of the first wedge element 1. The coloured end 11 of the screw 6 is received inside the socket 7, whereby the thread 10 at the coloured end 11 of the screw 6 is received in the thread in the through opening 17 of the socket 7. Thus, by means of the thread of respective part the position of the coloured end 11 of the screw 6 may be varied inside the through opening 17 of the socket 7. The socket 7 may be held at the arc 22 of the handle 5 by means of a locking ring, being placed in the groove 16 on the outside of the tubular part 13 of the socket 7. The socket 7 is held by the locking ring in a rotatable way. The arc 22 is placed between the flange 15 of the socket 7 and the locking ring placed in the groove 16 of the socket 7. To hold the socket 7 at the handle 5 the distance between the flange 15 and the groove 16 of the socket 7 should about correspond with the thickness of the arc 22 of the handle 5.

In the assembled wedge the screw 6 is held stationary in relation to the second wedge element 2, without any rotation or axial movement, but may move axially in relation to the socket 7, by means of rotation for the socket 7 on the screw 6.

By rotating the socket 7, e.g. by means of a wrench placed on the nut 14 of the socket 7, in a first direction the wedge will go towards a first extreme and by rotating the socket in the opposite direction the wedge will go towards a second extreme. By rotation of the socket 7 the screw 6 will be moved axially in relation to the socket 7. This relative axial movement between the screw 6 and the socket 7 is given by co-operation between the threads 10 at the coloured end 11 of the screw 6 and the threads of the through opening 17 of the socket 7. By said relative axial movement between the screw 6 and the socket 7 the first and second wedge elements 1 and 2 are given a corresponding relative axial movement, moving the first and second wedge elements 1, 2 towards or away from each other, depending on the rotational direction of the socket 7. When the first and second wedge elements 1, 2 are moved towards each other the third and fourth wedge elements 3, 4 will be forced away from each other, sliding along the sloped surfaces of the first and second wedge elements 1, 2, respectively. When the first and second wedge elements 1, 2 are moved away from each other the third and fourth wedge elements 3, 4 are allowed to move toward each other, sliding along the sloped surfaces of the first and second wedge elements, 1, 2, respectively. The third and fourth wedge elements 3, 4 will be urged towards each other by means of the spring arrangements and by means of the elastic modules inside the frame.

In use the wedge is moveable between two extremes, as indicated above. In a first extreme, as shown in FIG. 4, an upper surface of the third wedge element 3 is about flush with an upper surface of the first wedge element 1 and an upper surface of the second wedge element 2 and a lower surface of the fourth wedge element 4 is about flush with a lower surface of the first wedge element 1 and a lower surface of the second wedge element 2. This first extreme of the wedge could be called a flattened out position, as the wedge is as thin as it gets in that position. In said extreme the third and fourth wedge elements 3, 4 are abutting or are placed close to the screw 6. In a second extreme the first and second wedge elements 1, 2 are moved as close to each other as they can be moved and the third and fourth wedge elements 3, 4 are moved as far apart from each other as they can be moved. In the second extreme the wedge is as thick as it gets. In use the wedge may assume any position between the two extremes, and including said extremes.

Stop edges 25-28 of the screw 6, the inner opening of the first wedge element 1 and the through opening 17 of the socket 7, respectively, co-operate to define the first and second extremes of the wedge. The screw 6 has two stop edges 25, 26 placed at opposite ends of the thread 10 at the coloured end 11 of the screw 6. The stop edge 26 of the screw 6 facing away from the coloured end 11 co-operates with the stop edge 27 of the through opening of the first wedge element 1, defining the first extreme of the wedge. The stop edge 25 of the screw 6 facing the coloured end 11 co-operates with the stop edge 28 of the through opening 17 of the socket 7, defining the second extreme of the wedge. Said stop edge 28 of the through opening 17 of the socket 7 is placed in such a position that the coloured end surface 12 of the screw 6 will be flush with the outer end of the nut 14 of the socket 7 in the second extreme of the wedge. The length of the coloured end 11 of the screw 6, that is the part placed between the coloured end surface 12 and the thread 10, corresponds with the length of the through opening 17 inside the nut 14 and flange 15 of the socket 7. Thus, in the second extreme of the wedge the coloured end surface 12 of the screw 6 will be clearly visible at the mouth of the through opening 17 of the socket 7. In said second extreme of the wedge the inner coloured surface 18 of the through opening 17 of the socket 7 will no longer be visible.

The wedge is normally placed inside the frame with the wedge in the first extreme, whereby no compression force will be exerted on the modules inside the frame. When the wedge is in the second extreme it will exert maximal compression force on the modules inside the frame.

By giving the coloured end 11 of the screw 6, including the coloured end surface 12, and the inner surface 18 of the through opening 17 of the socket 7 different colours, it will be possible to get a clear indication that the wedge is in the second extreme. As indicated above, in one embodiment the coloured end 11 of the screw 6 is green, while the inner surface of the opening 17 of the socket 7 is red. Thereby, in the second extreme there will be a green "dot" at the centre of the nut 14 of the socket 7, in the form of the coloured end surface 12 of the screw 6. As soon as the wedge is not in the second extreme at least a part of the red inner surface 18 of the through opening 17 of the socket 7 will be visible. The further the wedge is moved from the second extreme, the more of the red inner surface 18 of the through opening 17 of the socket 7 will become visible. Thus, when nothing of the red inner surface of the through opening 17 of the socket 7 is visible, it indicates that the wedge is in the second extreme, giving maximal compression inside the frame.

The relationship between the coloured end 11 of the screw 6 and the through opening 17 of the socket 7 can also be used as a tactile indication of the compression. As long as one can feel that the coloured end surface 12 of the screw 6 is not flush with the outer end of the through opening 17 of the socket 7, the socket 7 is not yet screwed all the way to give maximal compression. Put in other words the wedge has not yet reached the second extreme. The tactile indication is vital for installations having poor visibility.

Figure 15:
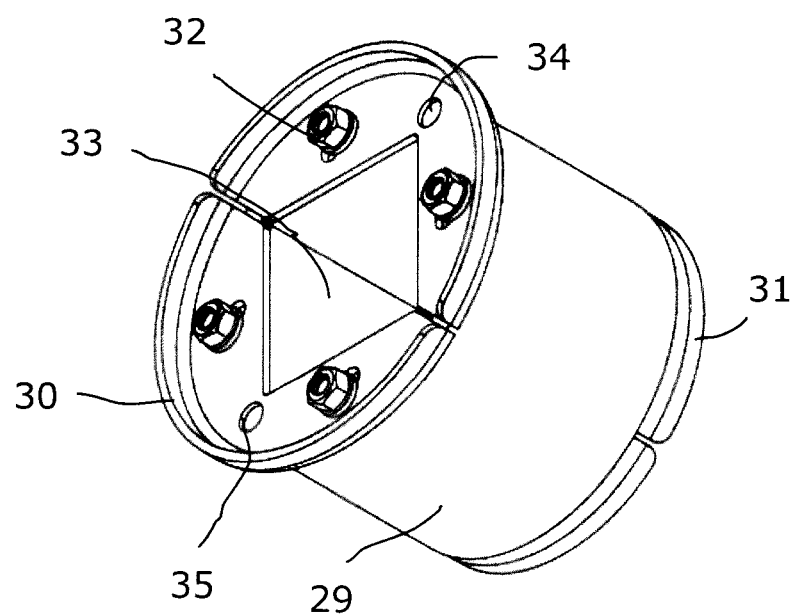
FIG. 15 is a perspective view of a seal having an indication means according to the present invention.

The seal shown in FIG. 15 comprises a compressible body 29, having a cylindrical outer surface. Front brackets 30 and rear brackets 31 are placed at opposite end surfaces of the compressible body 29. In the shown embodiment the compressible body 29 has a central opening 33 for receiving one or more modules, such as modules comparable with the modules 102 of FIG. 1. In other embodiments the central opening of the compressible body has a circular cross-section to receive a single cable or pipe. The seal is to be placed in an opening of a wall or the like. The front and rear brackets 30, 31 are connected by means of screws going through the compressible body 29. By means of nuts 32 placed on the screw at the front brackets 30, the compressible body 29 can be compressed in axial direction by reducing the distance between the front and rear brackets 30, 31. By the axial compression the compressible body 29 will press inwards against whatever is received in the central opening 33 and outwards against the surface of the opening receiving the seal. The compressible body 29 has indicators 34 co-operating with openings of the front brackets 30 to form indicator means. In the same way as described above the indicators 34 of the compressible body 29 has a different colour than an inner surface 35 of the co-operating openings. Each indicator 34 is normally formed as a raised part of the compressible body 29. The indicators 34 may have the same colour or a different colour to the compressible body 29. In some embodiments the indicators 34 are formed by the material of the compressible body 29 being pressed into the openings at compression. As long as the colour of the inner surfaces 35 of the openings at the indicators 34 is visible, it is an indication that the seal has not yet been compressed enough.

The invention claimed is:

1. Indication means showing a desired position of a wedge comprising a first wedge element and a second wedge element placed in line with each other and which wedge forms a part of a lead-through system further comprising a frame, modules, and stay plates, wherein the wedge is movable between two extreme positions by means of a socket and a screw received within a through opening of the socket, wherein the socket is constructed to rotate on the screw and that one extreme position of the wedge, in which the first and second wedge elements are as close as possible to each other, is indicated in that a mouth of the through opening of the socket and an end surface of the screw are flush with each other.

2. The indication means of claim 1, wherein the end of the screw covers an inner surface of the through opening of the socket to indicate one extreme position of the wedge.

3. The indication means of claim 2, wherein the wedge is moveable between the two extreme positions, in which the first and second wedge elements are as close or as far apart from each other as possible, wherein the screw is fixed to the second wedge element, wherein the socket is fastened to the first wedge element in a rotatable way, and wherein an end of the screw is received in the through opening of the socket.

4. The indication means of claim 3, wherein at least an end surface of the end of the screw received in the through opening of the socket is given a different colour than an inner surface of the through opening of the socket.

5. The indication means of claim 4, wherein the end surface of the screw is green and wherein the inner surface of the through opening of the socket is red.

6. The indication means of claim 3, wherein an inner surface of the through opening of the socket is visible when the wedge is not in the extreme position in which the first and second wedge elements are as close as possible to each other.

\* \* \* \* \*